March 4, 1924.　　　　V. W. PAGÉ　　　　1,485,809

REAR SPRING MOUNTING

Original Filed June 18, 1921

WITNESSES

INVENTOR
Victor W. Pagé
BY
ATTORNEYS

Patented Mar. 4, 1924.

1,485,809

UNITED STATES PATENT OFFICE.

VICTOR W. PAGÉ, OF NEW YORK, N. Y.

REAR-SPRING MOUNTING.

Original application filed June 18, 1921, Serial No. 478,527. Divided and this application filed February 7, 1922. Serial No. 534,774.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Rear-Spring Mounting, of which the following is a full, clear, and exact description.

The present invention relates to new and useful improvements in vehicle spring suspensions, and it pertains more particularly to a new and novel constructon for mounting and connecting rear springs particularly of the so-called cantilever type, and includes subject matter divided from my co-pending application filed June 18, 1921, Serial No. 478,527.

It is one of the primary objects of the invention to provide new and novel means for connecting the spring to the several points of attachment at its ends.

It is another object of the invention to provide a new and novel form of center bearing and attaching means for springs of the above-mentioned type.

It is a further object of the invention to provide a new and novel form of spring whereby the lubrication of the spring is greatly facilitated and more effectively carried out.

It is a still further object of the invention to connect the spring to the several parts so that it will have a more or less universal movement at the points of connection or attachment.

Referring to the drawings—

Figure 1:
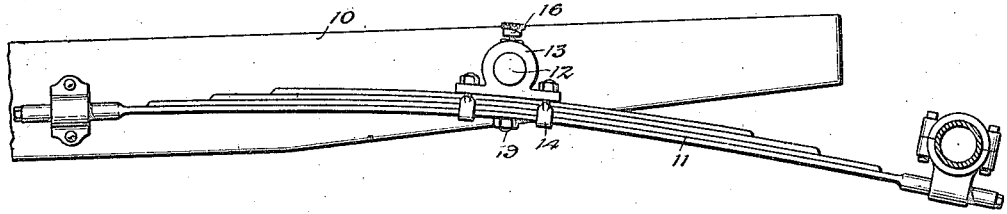
Figure 1 is a view in side elevation partly in section of the rear portion of one side of a vehicle showing the cantilever spring and its attachment to said vehicle.
Figure 2:
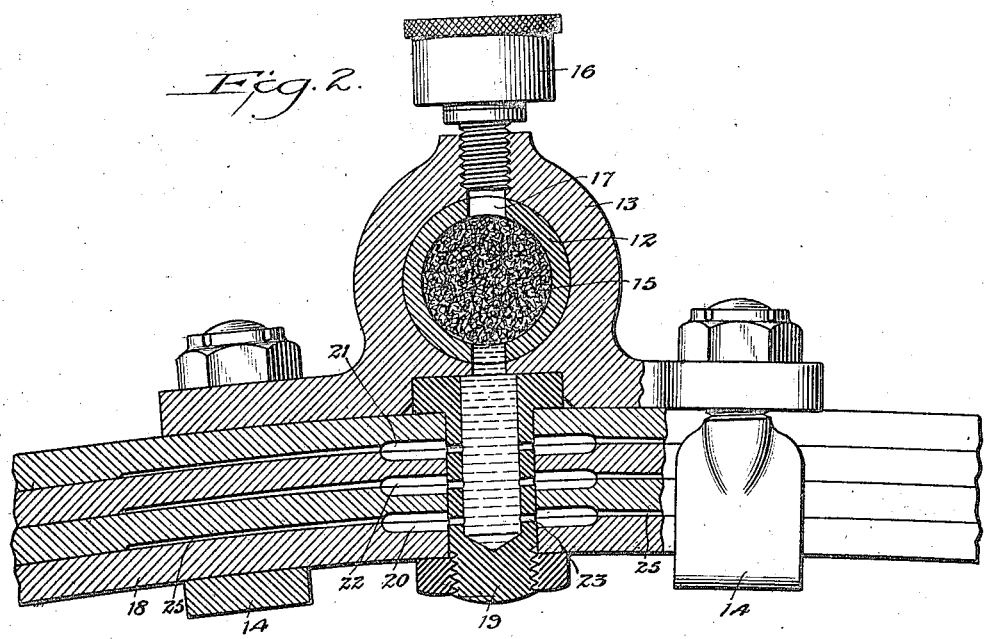
Fig. 2 is a sectional view taken transversely through the spring mounting.
Figure 3:
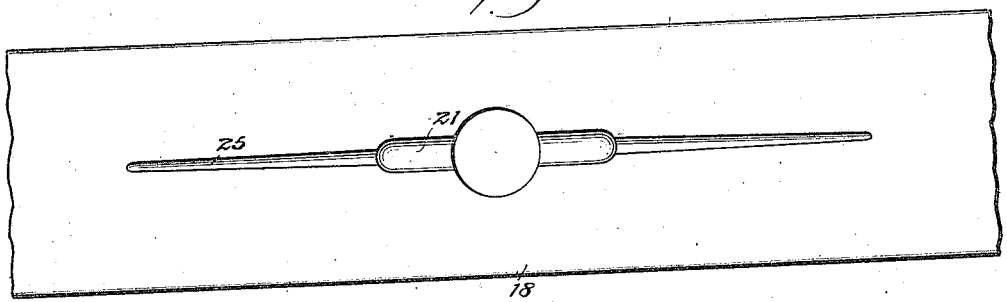
Fig. 3 is a plan view of one of the spring leaves.

Referring more particularly to the drawings, the reference character 10 designates one of the side frames of a vehicle chassis, and 11 designates the spring, which spring is shown of the cantilever type. Rigidly secured to the side frame 10 and projecting therefrom is a hollow bolt or the like 12, and said bolt forms the supporting means for a bearing 13 to which the spring 11 is secured by means of clips 14 or other suitable means. This hollow bolt 12 and bearing 13 form the means for connecting the center portion of the spring 11 to the frame, and said bearing is so mounted on the bolt 12 as to have free movement thereabout. This center bearing is more clearly shown in Fig. 2, and from said figure it will be apparent that the hollow bolt 12 is adapted to receive waste or other suitable packing 15.

The reference character 16 designates a suitable lubricant receptacle and said lubricant receptacle is carried by the bearing 13 and is adapted to discharge the lubricant contained therein into the packing 15 of the hollow bolt 12 by means of a passage 17, which passage extends through one of the walls of the hollow bolt.

The spring 11 comprises a plurality of leaves 18, and said leaves are secured together intermediate of their ends by a hollow bolt 19. The bottom leaf 18 is recessed on its upper face as indicated by the reference character 20, the upper leaf being recessed on its bottom face as indicated by the reference character 21. Each of the intermediate leaves is recessed upon its opposite faces as indicated by the reference character 22. The hollow bolt 19 is provided with a plurality of openings 23 extending though the side walls thereof at such a point as to discharge the lubricant contained within the hollow bolt to the several recesses at the central portion of the spring.

Leading from the recesses 20, 21 and 22 to a point beyond the clips 14, are lubricant ducts 25, by means of which the lubricant is introduced between the several leaves of the spring as they move relatively one to another during the action of the spring in use.

By this construction it is apparent that as the leaves move relatively one to another during the action of the spring, the lubricant will be discharged from the recesses 22 to a point between the leaves by means of the ducts 25.

What is claimed is:

A spring mounting comprising a hollow bolt carried by a vehicle frame, said hollow bolt having diametrically opposed openings, a lubricant vehicle carried within said hollow bolt, a bearing member surrounding said hollow bolt and having passages adapted to register with the diametrically opposed openings in the hollow bolt, a spring secured to said bearing, a second hollow bolt, said second hollow bolt passing through said spring and having its passage in alinement with the openings in the bearing, and a lubricant receptacle carried by said bearing member and adapted to discharge its contents through the said hollow bolts and their openings to the said spring.

VICTOR W. PAGÉ.